United States Patent [19]

McMahon et al.

[11] Patent Number: 4,874,563
[45] Date of Patent: * Oct. 17, 1989

[54] PROCESS FOR PREPARING TOWS FROM COMPOSITE FIBER BLENDS

[75] Inventors: Paul E. McMahon, Mountainside; Tai-Shung Chung, Summit; Lincoln Ying, Bridgewater, all of N.J.

[73] Assignee: BASF Structural Materials Inc., Charlotte, N.C.

[ * ] Notice: The portion of the term of this patent subsequent to Dec. 1, 2004 has been disclaimed.

[21] Appl. No.: 940,234

[22] Filed: Dec. 5, 1986

Related U.S. Application Data

[63] Continuation of Ser. No. 589,817, Mar. 15, 1984, abandoned.

[51] Int. Cl.[4] .................................................. D01G 13/00
[52] U.S. Cl. ....................................... 264/29.2; 57/350; 57/351; 57/908; 264/103; 264/DIG. 75
[58] Field of Search ...................... 264/136, 29.2, 103, 264/324, DIG. 75; 57/908, 350, 351

[56] References Cited

U.S. PATENT DOCUMENTS

| | | | |
|---|---|---|---|
| 2,964,900 | 12/1960 | Hicks | 57/140 |
| 3,073,005 | 1/1963 | Tiede . | |
| 3,175,351 | 3/1965 | Bloch . | |
| 3,252,484 | 5/1966 | Meyer . | |
| 3,358,436 | 12/1967 | Niina et al. | 57/162 |
| 3,380,131 | 4/1968 | Gray | 264/103 |
| 3,436,797 | 4/1969 | Graf et al. | |
| 3,873,389 | 4/1975 | Daniels . | |
| 3,978,267 | 8/1976 | Selwood | 428/360 |
| 4,051,660 | 10/1977 | Griset, Jr. | 57/140 |
| 4,084,399 | 4/1978 | Kanemaru et al. | |
| 4,159,618 | 7/1979 | Sakaris | 57/251 |
| 4,226,079 | 10/1980 | Mountney et al. . | |
| 4,343,146 | 8/1982 | Nelson | 57/908 |
| 4,410,385 | 10/1983 | Murphy . | |
| 4,457,345 | 7/1984 | Von Bluchen et al. | 428/367 |
| 4,539,249 | 9/1985 | Curzio | 428/175 |

FOREIGN PATENT DOCUMENTS

| | | |
|---|---|---|
| 894875 | 11/1982 | Belgium . |
| 0033244 | 1/1981 | European Pat. Off. . |
| 1779262 | 10/1971 | Fed. Rep. of Germany . |
| 2204119 | 9/1974 | Fed. Rep. of Germany . |
| 2166629 | 12/1974 | Fed. Rep. of Germany . |
| 2606290 | 8/1976 | Fed. Rep. of Germany ..... 264/29.2 |
| 7901172 | 1/1979 | France . |
| 47-3861 | 2/1972 | Japan . |
| 48-3536 | 1/1973 | Japan . |
| 51-49948 | 4/1976 | Japan . |
| 1200342 | 7/1970 | United Kingdom . |
| 1228573 | 4/1971 | United Kingdom . |
| 2093768 | 2/1982 | United Kingdom . |
| 2090882 | 7/1982 | United Kingdom . |
| 2093768 | 2/1983 | United Kingdom . |
| 2105247 | 3/1983 | United Kingdom . |

OTHER PUBLICATIONS

CJA Slater, Reserach Disclosure 20239, Feb. 1981.
NASA Tech. Brief, Fall 1982, by Robert Baucom, p. 98.

*Primary Examiner*—Hubert C. Lorin
*Attorney, Agent, or Firm*—Lynch, Cox, Gilman & Mahan

[57] ABSTRACT

A continuous, substantially uniform tow useful in forming composite molded articles is prepared by forming a continuous tow of continuous carbon fibers, forming a continuous tow of thermoplastic polymer fibers to a selected width, uniformly and continuously spreading the carbon fiber tow to a width that is essentially the same as the selected width for the thermoplastic polymer fiber tow, intermixing the tows intimately, uniformly and continuously, in a relatively tension-free state, and continuosuly withdrawing the intermixed tow.

20 Claims, 2 Drawing Sheets

PROCESS FOR PREPARING TOWS FROM COMPOSITE FIBER BLENDS

This invention was made with government support under contract No. NAS1-15749 awarded by the National Aeronautics and Space Administration (NASA). The Government has certain rights in this invention.

This is a continuation of co-pending application Ser. No. 589,817 filed on Mar. 15, 1984, now abandoned.

BACKGROUND OF INVENTION

This invention relates to processes for preparing fibers useful in forming composite articles. More particularly, this invention relates to carbon fiber-containing fiber blends which are useful in preparing composite articles.

Carbon fiber-containing tapes and rovings have been known for several years. See, for example, U.S. Pat. Nos. 3,704,485, 3,873,389, and 3,795,944, as well as U.S. Pat. Nos. 3,993,726 and 3,728,424.

Also it is known to intermix two similar or different types of fibers, particularly to obtain high bulk. See for example, U.S. Pat. Nos. 4,219,997, 4,218,869, 3,959,962, 3,968,638 and 3,958,310. And the combining of different types of fibers has been facilitated using various types of fluid jets. See, e.g., the '310 patent and U.S. Pat. No. 4,147,020. However, in the '020 patent, after combining the yarns are cut into short lengths.

U.S. Pat. No. 4,226,079, issued Oct. 7, 1980, discloses the combining of two different types of fibers, in order to produce a bulk yarn. The fibers are intermixed in a jet intermixing zone. However, the fibers disclosed in the patent are polyester and polyamid. No disclosure is made of the combining of carbon and thermoplastic fibers.

U.S. Pat. No. 3,175,351 discloses a method of bulking continuous filament yarns. In addition, it is disclosed that the two yarns which are combined may be of different compositions. However, none of the compositions is a carbon fiber.

U.S. Pat. No. 3,859,158 discloses the preparation of carbon fiber reinforced composite articles by forming an open weave of a carbon fiber and coating with a carbonaceous material. U.S. Pat. No. 4,368,234 discloses complex woven materials used for reinforcement which are formed from alternating bands of graphite fibers and low modulus fibers. However, the woven materials disclosed in this patent are subsequently impregnated with a thermosetting resin and cured.

Commonly assigned U.S. Pat. No. 4,479,999 to Buckley and McMahon, discloses an improved woven fabric comprised of fusible and infusible fibers wherein the infusible fibers include graphite or carbon fibers, and the fusible fibers are thermoplastic in nature. According to the patent, fusible and infusible fibers are woven into a fabric and thermally bonded together by heating above the melting point of the fusible fiber. This patent application does not disclose, however, the preparation of linearly intermixed fiber tow products or that such products are useful in forming composite articles. The patent application also does not disclose the preparation of such materials using a gas jet intermixing means.

In the prior art, there were two distinct methods of forming carbon fiber-containing composites. The first and older method involved simply forming a tape or fabric prepreg by painting or coating carbon fiber tows or fabric with a solution and/or low viscosity melt of a thermosetting material which was then cured. The second process involved the extrusion of carbon fiber tapes impregnated with high melting, thermoplastic polymers. These tapes or fabrics were then used in forming the composite. However, the prepregs formed by both of these processes were somewhat difficult to handle. Specifically, prior art thermoplastic tapes were stiff and "boardy" and could not be draped across intricately shaped molds. While thermoset prepregs were somewhat more flexible, they were often quite tacky and difficult to handle. As a result, the use of both types of tapes was limited.

Accordingly, it is an object of this invention to prepare fibrous blends which are useful in forming thermoplastic carbon fiber composites.

It is another object of this invention to prepare materials, e.g., fabrics, which may be formed into fiber composites.

These and other objectives are obtained by employing the process of the instant invention.

SUMMARY OF INVENTION

Basically, the process of this invention involves (a) forming a carbon fiber tow from a multitude of carbon fibers; (b) forming a thermoplastic polymeric fiber tow; (c) intermixing the two tows; and (d) withdrawing the intermixed tows for use. The intermixed tows may then be employed in forming various carbon fiber-containing composites.

The fiber blends prepared according to the instant invention are flexible and handleable and have good draping properties, so that they can be used to form intricately shaped articles. In addition, because of the intermixing of the two fibers, good wetting of the carbon fiber by the thermoplastic material is obtained when appropriate heat and pressure are applied to the mold. Good wetting is obtained in large measure because of the substantially uniform distribution of the thermoplastic fiber and the carbon fiber withing the fiber blend. Specifically, the products of the instant invention find particular utility in end use applications where a small radius of curvature in the final product is desired. For example, using the prior art tapes, it was not possible in many instances to prepare articles which had 90° bend, because the tapes would crack or deform at the bend line. However, the processes of the instant invention may be employed with radii of curvature as low as 0.002 in.

DETAILED DESCRIPTION OF INVENTION

Figure 1:
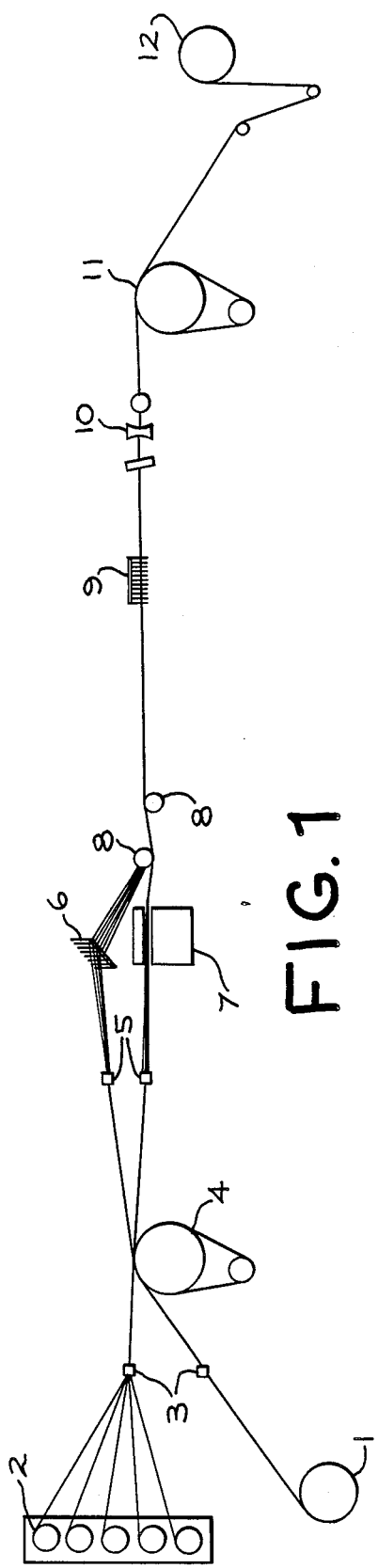
FIG. 1 is a diagrammatic view of the various devices used in carrying out one of the processes of the instant invention.

The thermoplastic polymers which are useful in carrying out the instant invention constitute virtually any type of relatively high molecular weight thermoplastic polymer, including polyethylene, polypropylene, polyester, the various polyamides, polyimides, polyamidimides, polyetherimides, polysulfones (e.g., polyether sulfones), polyether ether ketones, polybutylene terephthalate and the like. The melting point of the polymer must be at least 50° F. and preferably at least 200° F. above ambient conditions. Higher melting temperatures insure that there will be no undue sticking or binding of the spun fibers prior to use. In addition to one component polymer systems, mixtures of various thermoplastic polymers may also be employed to advantage where specific combinations of properties are desired.

Of particular importance are the liquid crystal polymers or LCPs. Examples of these polymers include the wholly aromatic polyester resins which are discussed in the following publications: (a) *Polyesters of Hydroxybenzoic Acids*, by Russell Gilkey and John R. Caldewell, J. of Applied Polymer Sci., Vol. II, Pages 198 to 202 (1959), (b) *Polyarylates* (*Polyesters From Aromatic Dicarboxylic Acids and Bisphenols*), by G. Bier, Polymer, Vol. 15, Pages 527 to 535 (August 1974), (c) *Aromatic Polyester Plastics*, by S. G. Cottis, Modern Plastics, Pages 62 to 63 (July 1975); and (d) *Poly(p-Oxybenzoyl Systems): Homopolymer for Coatings: Copolymers for Compression and Injection Molding*, by Roger S. Storm and Steven G. Cottis, Coatings Plast. Preprint, Vol. 34, No. 1, Pages 194 to 197 (April 1974). See also, U.S. Pat. Nos. 3,039,994; 3,169,121; 3,321,437; 3,553,167; 3,637,595; 3,651,014; 3,723,388; 3,759,870; 3,767,621; 3,778,410; 3,787,370; 3,790,528; 3,829,406; 3,890,256; and 3,975,487.

Other polyesters are disclosed, for instance, (a) Polyester X7G-A Self Reinforced Thermoplastic, by W. J. Jackson, jr., H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1 to 4, (b) Belgian Pat. Nos. 838,935 and 828,936, and (c) Dutch Pat. No. 7505551, (d) West German Pat. Nos. 2520819, 2520820, 27222120, 2834535, 2834536 and 2834537, (e) Japanese Pat. Nos. 43-223; 2132-116; and 3021-293, and (f) U.S. Pat. Nos. 3,991,083; 4,991,014; 4,057,597; 4,066,620; 4,067,852; 4,075,262; 4,083,829; 4,093,595; 4,112,212; 4,118,372; 4,130,545; 4,130,702; 4,146,702; 4,153,779; 4,156,070; 4,159,365; 4,160,755; 4,161,470; 4,169,933; 4,181,792; 4,183,895; 4,184,996; 4,188,476; 4,191,681; 4,201,856; 4,219,461; 4,224,433; 4,226,970; 4,230,817; 4,232,143; 4,238,598; 4,238,600; 4,239,913; 4,242,496; 4,245,082; 4,245,804; 4,247,514; 4,256,624; 4,265,802; 4,267,289; 4,269,965; 4,279,803; and 4,299,756.

The polyesters and copolyesters which are preferred consist essentially of structural units having recurring groups of the formula

  (I)

  (II)

  (III)

wherein units I and II, if present, are present in substantially equimolar amounts; $R_1$, $R_2$ and $R_3$ are radicals selected from the group of (1) single and fused six-membered aromatic carbocyclic ring systems wherein the chain-extending bonds of the ring system if attached to the same ring, are positioned 1,3- or 1,4- (preferably 1,4-) to each other, and if attached to different rings, are preferably in positions parallel and oppositely directed, and (2) multiple six-membered aromatic carboxcyclic ring systems in which the individual rings are joined by a chemical bond or a trans-vinylene group and in which the chain extending bonds of each ring are in the 1,3- or 1,4- (preferably 1,4-) positions; $R_2$ may also be

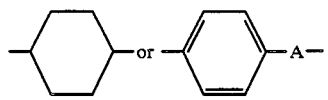

wherein A is a divalent radical containing one or two bicyclic in-chain atoms; and $R_3$ may also be

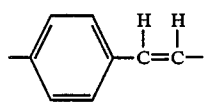

wherein the aliphatic portion is attached to the carbonyl group. Preferred group (1) radicals are phenylene and naphthylene. Preferred group (2) radicals are two-ring systems. Illustrative of (1) are

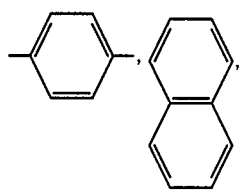

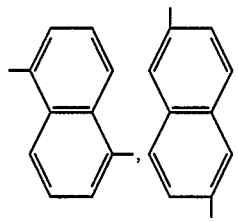

and of (2) are

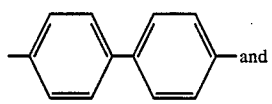

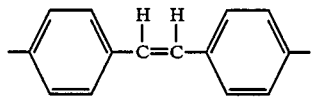

The foregoing ring systems, except for $R_2$, as indicated below are also intended to include one or more substituents, e.g., chloro, bromo, fluoro, or lower alkyl (1–4 carbon atoms) on the ring or rings. The $R_2$ aromatic ring systems should preferably be unsubstituted when only one kind of unit I and one kind of unit II are used, i.e., when a homopolymer is formed to insure obtaining oriented fibers. In the case of copolymers, it is preferred that the $R_2$ aromatic ring systems be unsubstituted because of thermal or hydrolytic instability and/or cost of the $R_2$-ring substituted copolymers.

Also included are those (co)polyesters wherein up to 25 mol %, preferably up to 5 mol %, based on the total I, II and III units, are aromatic polymer-forming units (i.e., units wherein the chain extending functional groups are attached to aromatic rings) not conforming to those described above and which do not interfere with the anisotropic melt forming capability of the polymers. A non-limiting list of these units includes

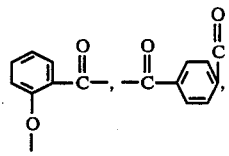

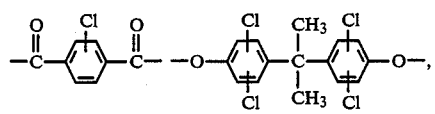

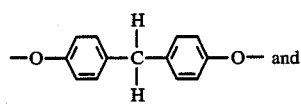

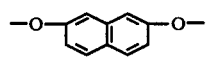

The (co)polyesters, as mentioned above, may comprise units I and II in substantially equimoler amounts or may comprise unit III or may comprise a combination of units I, II, and III and, or course, more than one kind of unit (I, II and/or III) can be present in the polymer.

Preferred (co)polyesters of the invention consist essentially of units I and II. In such polymers, it is preferred that $R_1$ is selected from the group of 1,4-phenylene; chloro-, dichloro-, bromo-, dibromo-, methyl-, dimethyl- and fluoro-1,4-phenylene; 4,4'-biphenylene; 3,3',5,5'-tetramethyl-4,4'-biphenylene and $R_2$ is selected from the group of trans-1,4-cyclohexylene; trans-2,5-dimethyl-1,4-cyclohexylene; trans-vinylenebis(1,4-phenylene); 4,4'-biphenylene; 2,6-naphthylene; and 1,4-phenylene and with the proviso that more than one kind of unit I or II are present. Of such copolyesters, two types are particularly preferred because of properties and cost. In the first type, the polymers consist essentially of the recurring units

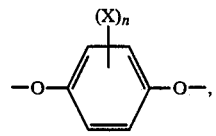

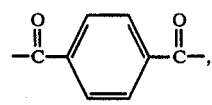

and

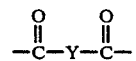

wherein X is selected from the group of chloro-, bromo-, fluoro-, and methyl radicals; n is 1 or 2; and Y is selected from the group of 4,4'-biphenylene and 2,6-naphthylene, the ratio of

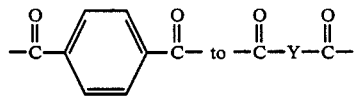

units being within the range of 4:1 to 1:4. In the second type, the polymers consist essentially of the recurring units

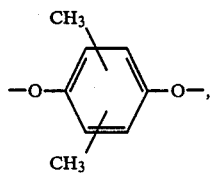

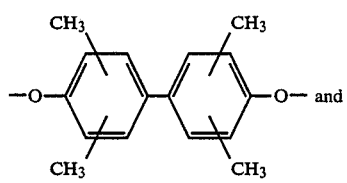

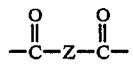

wherein Z is selected from the group of 4,4'biphenylene, 2,6-naphthylene, and 1,4-phenylene, the ratio of

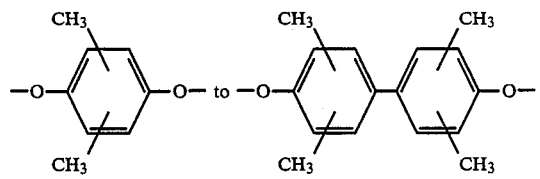

units being within the range of 4:1 to 3:2. With each type of polymer, up to 25 mol percent of non-conforming units may be present as described above.

A list of useful dicarboxylic acids includes terephthalic acid, 4,4'-bibenzoic acid, 4,4'-oxydibenzoic acid, 4,4'-thiodibenzoic acid, 4-carboxyphenoxyacetic acid, 4,4'-transstilbenedicarboxylic acid, 2,6-naphthalenedicarboxylic acid, ethyleneoxy-4,4'-dibenzoic acid, isophthalic acid, the halogen and methyl substituted derivatives of the foregoing dicarboxylic acids, 1,4-trans-cyclohexanedicarboxylic acid, 2,5-dimethyl-1,4-trans-cyclohexanedicarboxylic acid, and the like.

A nonlimiting list of phenolic carboxylic acids includes 6-hydroxy-2-naphthoic acid, 4-hydroxy-4'carboxy azobenzene, ferulic acid, 4-hydroxybenzoic acid, 4-(4'-hydroxyphenoxy)-benzoic acid and 4-hydroxycinnamic acid and the alkyl, alkoxy and halogen substituted versions of these compounds.

Of the (co)polyesters containing only type III units, the polymers consisting essentially of the recurring units

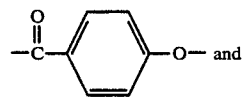

(1,4-benzoate unit)

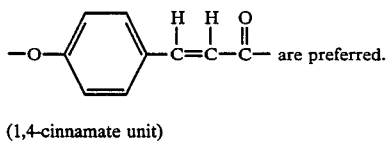 are preferred.

(1,4-cinnamate unit)

The (co)polyesters are prepared preferably by melt polycondensation of derivatives of dihydric phenols and aromatic-aliphatic, aromatic and cycloaliphatic dicarboxylic acids or their derivatives. A convenient preparative method is the melt polycondensation of the diacetate of a dihydric phenol with a dicarboxylic acid. Alternatively, phenolic carboxylic acids or their derivatives may be used as coreactants in the preparation of polyesters and copolyesters.

A list of useful dihydric phenols preferably in the form of their diacetate derivatives includes hydroquinone, chlorohydroquinone, bromohydroquinone, methylhydroquinone, dimethylhydroquinone, dichlorohydroquinone, dibromohydroquinone, 4,4'-oxydiphenol, 4,4'-isopropylidenediphenol, 4,4'-thiodiphenol, 4,4'-biphenol, 3,5,3',5'-tetramethyl-4,4'-bisphenol, 3,5,3',5'-tetrachloro-4,4'-biphenol, 2,6-dihydroxynaphthalene, 2,7-dihydroxynaphthalene, and 4,4'-methylenediphenol and the like.

In addition, it is possible to prepare anisotropic polymers by polymerizing methylacryloxy benzoic acid utilizing an alkali metal hydroxide and free radical initiators as described in U.S. Pat. Nos. 4,112,212, 4,130,702 and 4,160,755.

Useful phenolic-carboxylic acid derivatives include p-acetoxybenzoic acid and p-acetoxycinnamic acid and the like.

In addition, it is possible to prepare anisotropic polymers by polymerizing methylacryloxy benzoic acid utilizing an alkali metal hydroxide and free radical initiators as described in U.S. Pat. Nos. 4,112,212, 4,130,702 and 4,160,755.

Useful phenolic-carboxylic acid derivatives include p-acetoxybenzoic acid and p-acetoxycinnamic acid and the like.

A nonlimiting list of various polyesters and copolyesters includes: poly(methyl-1,4-phenylene 2,5-dimethyl-trans-hexahydroterephthalate); copoly(methyl-1,4-phenylene trans-hexahydroterephthalate/terephthalate) (8/2); copoly(chloro-1,4-phenylene trans-hexahydroterephthalate/isophthalate) (9/1) and (8/2); copoly-(ethyl-1,4-phenylene terephthalate/2,6-naphthalate) (7/3); copoly(tert. butyl-1,4-phenylene/3,3',5,5'-tetramethyl-4,4'-biphenylene/terephthalate) (7/3); copoly(chloro-1,4-phenylene/-3,3',5,5'-tetrachloro-4,4'-biphenylene terephthalate) (7/3), The liquid crystal polymers including wholly aromatic polyesters and poly(ester-amide)s which are suitable for use in the present invention may be formed by a variety of ester forming techniques whereby organic monomer compounds possessing functional groups which, upon condensation, form the requisite recurring moieties are reacted. For instance, the functional groups of the organic monomer compounds may be carboxylic acid groups, hydroxyl groups, ester groups, acryoxy groups, acid halides, amine groups, etc. The organic monomer compounds may be reacted in the absence of a heat exchange fluid via a melt acidolysis procedure. They, accordingly, may be heated initially to form a melt solution of the reactants with the reaction continuing as said polymer particles are suspended therein. A vacuum may be applied to facilitate removal of volatiles formed during the final state of the condensation (e.g., acetic acid or water).

Commonly-assigned U.S. Pat. No. 4,083,829, entitled "Melt Processable Thermotropic Wholly Aromatic Polyester," describes a slurry polymerization process which may be employed to form the wholly aromatic polyesters which are preferred for use in the present invention. According to such a process, the solid product is suspended in a heat exchange medium. The disclosure of this patent has previously been incorporated herein by reference to its entirety. Although that patent is directed to the preparation of wholly aromatic polyesters, the process may also be employed to form poly(ester-amide)s.

When employing either the melt acidolysis procedure or the slurry procedure of U.S. Pat. No. 4,083,829, the organic monomer reactants from which the wholly aromatic polyesters are derived may be initially provided in a modified form whereby the usual hydroxy groups of such monomers are esterified (i.e., they are provided as lower acyl esters). The lower acyl groups preferably have from about two to about four carbon atoms. Preferably, the acetate esters of organic monomer reactants are provided. When poly(ester-amide)s are to be formed, an amine group may be provided as a lower acyl amide.

Representative catalysts which optionally may be employed in either the melt acidolysis procedure or in the slurry procedure of U.S. Pat. No. 4,083,829 include dialkyl tin oxide (e.g., dibutyl tin oxide), diaryl tin oxide, titanium dioxide, antimony trioxide, alkoxy titanium silicates, titanium alkoxides, alkali and alkaline earth metal salts of carboxylic acids (e.g., zinc acetate), the gaseous acid catalysts such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

The wholly aromatic polyesters and poly(ester-amide)s suitable for use in the present invention tend to be substantially insoluble in common polyester solvents and accordingly are not susceptible to solution processing. As discussed previously, they can be readily processed by common melt processing techniques. Most suitable wholly aromatic polymers are soluble in pentafluorophenol to a limited extent.

The wholly aromatic polyesters which are preferred for use in the present invention commonly exhibit a weight average molecular weight of about 2,000 to 200,000, and preferably about 10,000 to 50,000, and most preferably about 20,000 to 25,000. The wholly aromatic poly(ester-amides) which are preferred for use in the present invention commonly exhibit a molecular weight of about 5,000 to 50,000, and preferably about 10,000 to 30,000; e.g., 15,000 to 17,000. Such molecular weight may be determined by gel permeation chromatography and other standard techniques not involving the solutioning of the polymer, e.g., by end group determination via infrared spectroscopy on compression molded films. Alternatively, light scattering techniques in a pentafluorophenol solution may be employed to determine the molecular weight.

The wholly aromatic polyesters and poly(ester-amide)s additionally commonly exhibit an inherent viscosity (I.V.) of at least approximately 2.0 dl./g., e.g., approximately 2.0 to 10.0 dl./g., when dissolved at a concentration of 0.1 percent by weight in pentafluorophenol at 60° C.

For the purposes of the present invention, the aromatic rings which are included in the polymer backbones of the polymer components may include substitution of at least some of the hydrogen atoms present upon an aromatic ring. Such substituents include alkyl groups of up to four carbon atoms; alkoxy groups having up to four carbon atoms; halogens; and additional aromatic rings, such as phenyl and substituted phenyl. Preferred halogens include fluorine, chlorine and bromine. Although bromine atoms tend to be released from organic compounds at high temperatures, bromine is more stable on aromatic rings than on aliphatic chains, and therefore is suitable for inclusion as a possible substituent on the aromatic rings.

The fibers useful herein are basically carbon fibers which may be prepared by a variety of methods. Virtually any of the prior art methods of carbon fiber preparation may be employed in this invention.

The preparation of carbon fibers has been well known in the art for many years. Basically, there are two methods for preparing these fibers, which differ with respect to the starting materials employed. One method starts with a natural or synthetic fiber, which is then carbonized. In the other process petroleum pitch or coal tar pitch is used as the starting material. Typical of the patents involving the use of pitch is U.S. Pat. No. 4,317,809, which is incorporated herein by reference, along with the other patents cited therein. Generally, using the pitch process, the pitch is heated under high pressure and then under atmospheric pressure with sparging to form a mesophase pitch. Following this step, the pitch is converted into a fiber, thermoset, and carbonized.

Included among the fibers which may be formed into graphite or carbon fibers and are useful in this invention are those materials where the polymeric precursor is, for example, cellulose, acrylic derivatives, and, in particular, polyacrylonitriles. Specifically, the acrylic polymer may contain not less than about 85 mol percent of acrylonitrile units, with not more than about 15 mol percent of a monovinyl compound which is copolymerizable with acrylonitrile, such as styrene, methylacrylate, methylmethacrylate, vinyl acetate, vinyl chloride, vinylidene chloride, vinyl pyridine and the like. Other copolymerizable monomers include styrene sulfonic acid, allyl sulfonic acid, alkyl acrylates and methacrylates, vinyl acetate, vinyl proprionate, vinyl chlorine, vinylidine chloride, and the like.

There are numerous procedures for carbonizing the precursors fibers of the instant invention. In general, they involve a first heating step in the range of about 200°–400° C., followed by a second heating step in a non-oxidizing atmosphere at temperatures ranging from 800°–3000° C. For examples of these processes which are incorporated by reference herein, see U.S. Pat. No. 4,197,282, U.S. Pat. No. 4,079,122, as well as U.S. Pat. No. 4,131,644.

The carbon fibers which are particularly useful herein have bundle or tow deniers in the range of from 300–100,000 and filament counts of from 300–300,000, preferably deniers of 1,000–16,000 and filament counts of 3,000–24,000. The fibers also should exhibit a tensile strength of at least about 100,000 psi and a tensile modulus of about $10-120 \times 10^6$ psi.

The thermoplastic fibers which are particularly useful herein have bundle cross-sectional areas ranging from about twice that of the carbon fiber tows to about one-half that of the carbon fiber tow. The denier of individual thermoplastic fibers will be in the range of 1 to 50, and the fiber count will depend upon single filament denier (higher counts are required with lower denier filaments). However, in general, from about 10 to about 150,000 filaments, preferably 100 to 10,000 filaments, are employed. The modulus of the fiber should be in the range of 50,000 to 500,000 psi. The thermoplastic fiber also must exhibit a melting point of more than 50° F., preferably more than 200° F., above ambient temperatures. And of course, the fiber must melt and fuse at temperatures no higher than about 1,000° F., preferably no higher than 800° F., in order to be useful herein.

The weight ratio of the two fibers which are intermixed can vary widely. However, in order to prepare satisfactory composites, it is necessary that sufficient thermoplastic polymer fiber be employed to obtain complete wetting of the carbon fibers. Generally, no less than about 30 percent, by volume, of the thermoplastic polymer fibers may be employed. The maximum amount of thermoplastic polymer depends upon the strength properties which are required. In general, when less than about ten percent, by volume, of the carbon fiber is present, the resulting composite products have strength and stiffness properties which are poor in relation to products containing higher amounts of carbon fibers. Preferably about 20 to about 60 percent, by volume, of the carbon fiber material should be present in the combined tow.

In addition to the carbon fiber and the thermoplastic fibers which are used herein, it is possible to add to the fiber blends of the instant invention other non-thermoplastic fibers as reinforcing fibers. Examples of these materials include the various types of fiberglasses and ceramic fibers. In the event additional reinforcing fibers are added, it is possible to reduce the amount of the carbon fiber which is used to as low as approximately 10 volume percent. However, the maximum combined amount of the added reinforcing fiber plus the amount of the carbon fiber which is employed should not exceed the upper limit specified above for the carbon fiber alone.

In FIG. 1 of the instant invention, a carbon fiber tow (1) is obtained having the properties specified above. The fibers from the carbon fiber tow are passed through a fiber guide (3) and onto a first Godet roll (4). The first Godet roll is synchronized with a second Godet roll (11) at rates of speed such that the second Godet roll revolves slightly slower than the first Godet roll. Hence, the fibers between the two Godet rolls, which are subsequently spread and intermixed during the process of the invention, remains in a low tensioned (approaching tension-free) state which provides for effective fiber intermixing. Individual thermoplastic polymer fibers, such as polybutylene terephthalate fibers, are mounted on a bobbin rack (2) and the fibers are fed through a fiber guide (3) onto the first Godet roll (4). A tension comb may be employed after the fibers leave the bobbin and before they are brought into contact with the Godet roll. This tension comb serves to improve the contact of the fiber with the Godet roll and to increase the width of the fiber tow.

At this point in the process neither the carbon fibers nor the thermoplastic fibers are intermixed or are in contact. Rather, both are wrapped separately around the first Godet roll (4) to provide tension control. After leaving the Godet roll, the individual fibers separately pass through a fiber guide (5) to maintain directional control. After leaving the fiber guide (5), the thermoplastic polymer fibers pass through a fiber comb (6). The fiber comb having a plurality of spaced-apart fingers acts to maintain as separate the various fine yarns of the thermoplastic polymeric fiber so as to preserve separation of the individual fibers. The carbon fibers, on the other hand, after heaving the fiber guide (5), are directed into a gas banding jet (7).

Figure 4:
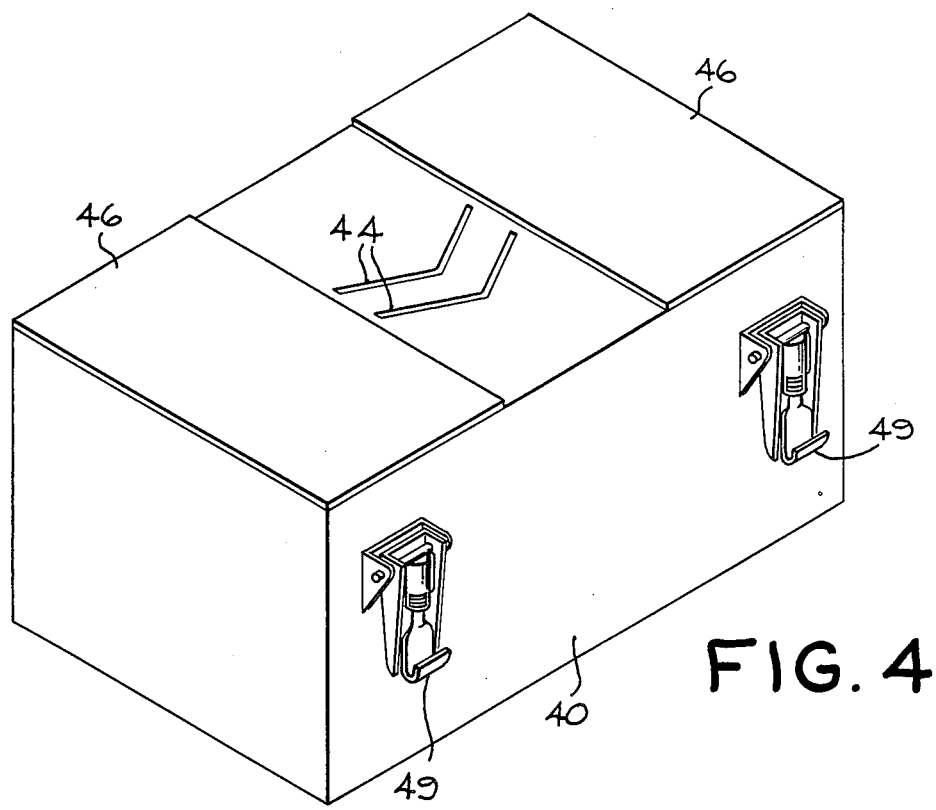
FIG. 4 is a perspective view of the same device with the top removed.
Figure 3:
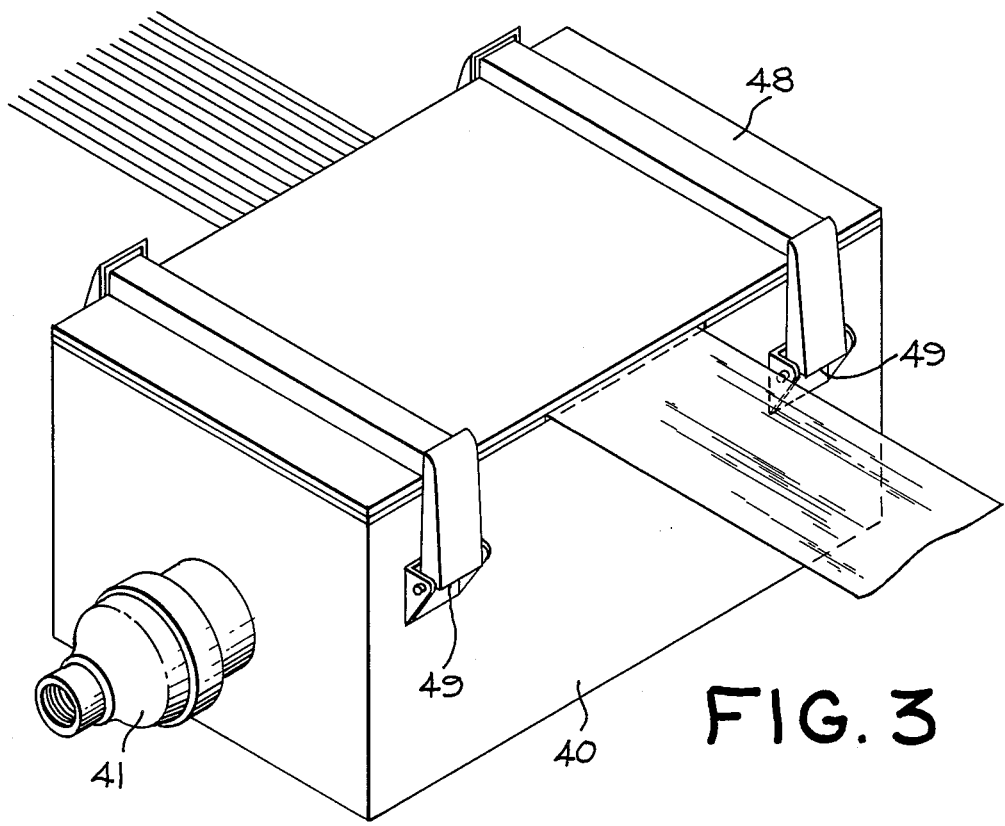
FIG. 3 is a perspective view of the gas spreading means used in carrying out a part of the the process of the instant invention.

The gas banding jet shown in FIGS. 3 and 4 is used to uniformly spread the fiber tows. A gas "banding" jet can also be used as an intermixing means whereby the gas jet serves to uniformly intermix the two fiber tows. The banding jet consists of a gas box (40) into which compressed air or another gas is fed through a conventional adjustable gas metering means (41). The preferred pressure of gas flow into the gas jet is in the range of approximately 0.5 to 10 psi. One, or more than one, gas exit ports (44) are provided to cause gas from within the gas box to impinge in a generally perpendicular fashion upon the fiber tow which passes across the exit ports. Preferably the exit ports are V-shaped and pointed in the direction of movement of the fiber tow across the box.

As shown in FIG. 4, the gas banding jet is provided with shims (46) or other means to allow a gas box cover (48) to be attached, so that a flow channel for the fibers is provided. The gas box cover is held in place by convenient attachment means, such as claims (49).

Figure 2:
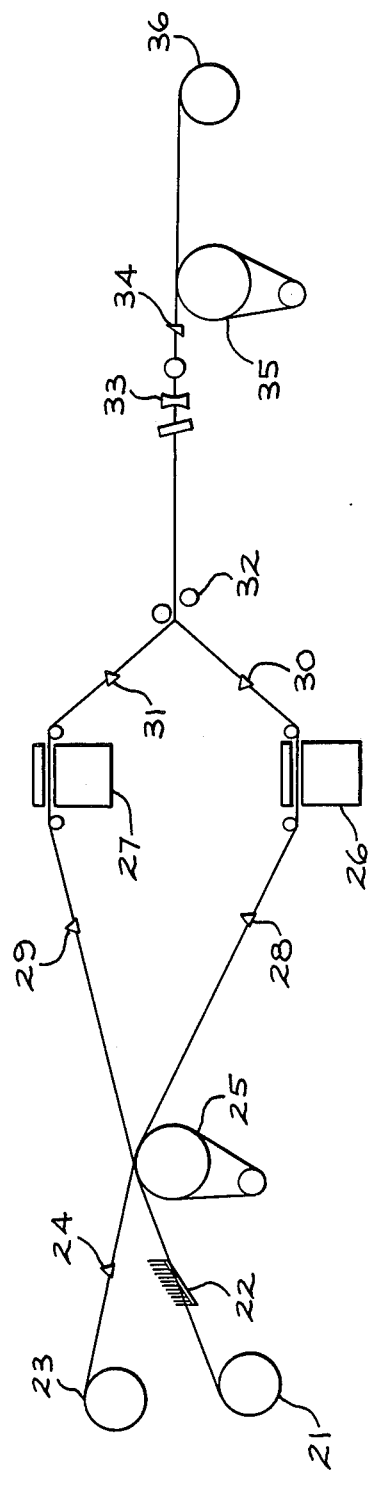
FIG. 2 is a diagrammatic view of the various devices used in carrying out another version of the processes of the instant invention.

In an alternative process shown in FIG. 2 both the thermoplastic fiber and the carbon fiber are subject to gas banding jet treatment (26) and (27). However, particularly with lower molecule weight, less high melting polymers, such as polybutylene terephthalate, a fiber comb having a plurality of spaced-apart fingers, as described above, may be employed in place of the banding jet.

After the fibers are spread by banding jets or banding jets in combination with combs, they are intermixed using an intermixing means (8). In FIG. 1 the intermixing means is a pair of stationary rods or bars. The fibers from the spread carbon fiber tow and the fibers from the spread thermoplastic tow or yarns both initially come into contact together on the bottom of the first stationary rod or bar. The fibers then are deflected across the top of the second stationary bar or rod and, as a result, are intermixed. In order to ensure complete intermixing, it is necessary that both fibers be uniformly spread across their entire width and that the area within which both fibers are spread be virtually identical. Finally, it is necessary that intermixing be undertaken in a relatively tension-free state. If high tension is imparted to either of the fiber tows, full (or optimal) intermixing may not occur. After passing over and under the stationary bars, the combined fiber two may be further intermixed using an air entanglement jet as described above.

After intermixing, the fibers pass through a comb (9) to maintain dimensional stability and through twist guides (10) to impart a slight twist to the intermixed fibers. The twist is imparted in order to maintain the intermixing of the fibers. Instead of using an actual half-twist, false-twisting of the fibers using methods well known in the art may be employed. In the alternative, a fiber wrap may be used to hold the intermixed fibers together. The overwrap may be of any convenient type of fiber. However, it is preferred that the overwrap consist of a relatively small quantity of thermoplastic fibers.

The mixed fibers are then wrapped around a second Godet roll (11) which, as pointed out above, serves in conjunction with the first Godet roll to provide a relatively tension-free zone to allow fiber intermixing. The fibers are then taken up by a takeup roll (12) for storage. Of course, it is possible to impart false-twisting or actual twisting or to wrap the fiber tow with another fiber either before or after the Godet roll. In addition, the intermixed fibers may be made stable by application of an appropriate fiber finish which serves to hold the intermixed fibers together and enable easier handling in subsequent operations, such as weaving.

FIG. 2 is similar to FIG. 1 but is the process most preferred when a liquid crystal type polymer or other higher melting point polymer is used. In FIG. 2 a carbon fiber roll (21) feeds carbon fiber through tension comb (22) and onto Godet roll (25). Liquid crystal fibers from a roll (23) are fed through a guide (24) and onto the same Godet roll (25). Separation is maintained between both fibers on the Godet roll. As pointed out above, the first Godet roll (25), when used in combination with the optional second Godet roll (35), serves to maintain the fibers in a relatively tension-free state during the intermixing process. High tension during intermixing must be avoided to assure that complete intermixing occurs.

After the carbon fibers and the liquid crystal fibers leave the first Godet roll they are both fed into gas banding jets (26) and (27) through guides (28) and (29), respectively. In the gas banding jet the fibers are spread to a uniform width. The fibers then pass through a second set of fiber guides (30) and (31) and are intermixed using the stationary, longitudinally extended bars shown at (32). In general, intermixing occurs as the thermoplastic bundle is fed onto the same bar in the same area as is the carbon fiber. At this point in the processing, the width of both tows is the same, and as they are brought simultaneously into contact with the same area of the bar, intimate intermixing occurs. In an alternative intermixing process, the two fiber tows are fed simultaneously into a gas jet or other gaseous intermixing device in a relatively tension-free state. In addition, the fibers may be fed into a gas jet for further intermixing after they have been treated on the stationary bars. In the gas intermixing means a jet of air impinges on the fibers, preferably perpendicular to their direction of flow.

Following intermixing, the fibers are fed through twist guides (33) to add at least a half-twist per yard to the fiber to ensure dimensional stability. Fibers then pass through a guide (34) onto a second Godet roll (35) and from there onto a take-up roll (36).

In use, the intermixed fibers may be filament wound, or otherwise assembled and placed on a mold, and heated under pressure to the flow temperature of the thermoplastic polymer to form composite articles which are useful in a variety of end uses where high strength, high stiffness and low weight are essential. For example, the composites formed from products prepared according to this invention may be used in forming spacecraft, airplane or automobile structural components. In addition, the carbon fiber blends of the instant invention find particular utility in those end uses where complex, three-dimensional shapes are involved. As pointed out above, the compositions of the instant invention are particularly useful where there is a small radius of curvature requiring substantial bending and shaping of the compositions of the instant invention. The only limiting factor in forming carbon fiber shaped articles using the compositions of the instant invention is the "bendability" of the carbon fiber itself. Therefore, utilizing the compositions of the instant invention, it is possible to prepare materials having a minimum radius of curvature of about 0.002 in., preferably as low as 0.003 in. However, with prior art thermoplastic tapes, the minimum radius of curvature is about 0.005 in. (Even then fiber directionality or alignment is distorted.) As structural elements formed from the fiber tows of this invention are heated under pressure above the melting point of the thermoplastic fiber, these fibers melt and fuse the carbon fibers together forming a consolidated composite product containing well-dispersed reinforcing fibers. Using the fiber blends of the instant invention, it is possible to prepare recreational articles, such as tennis racquet frames, racquetball racquet frames, hockey sticks, ski poles, fishing rods, golf club shafts and the like.

The fibers of the instant invention find particular utility in filament winding applications. As pointed out above, in the prior art it was extremely difficult to prepare composite articles utilizing the prior art fiber tapes. These tapes, which are prepared on extremely large scale, are difficult to handle on a small scale, and it is particularly difficult to form them into intricately shaped articles. While the prior art employed the filament winding process with success, this process was limited to use of carbon fibers in combination with thermosetting resins if long, thin rods were to be prepared. In the prior art process, the graphite was wound onto a mold after applying a thermosetting coating or coated with the thermosetting material after winding. As a result, however, it was often difficult for the thermosetting material actually to penetrate and/or achieve good wetting of closely wound products.

Utilizing the process of the instant invention in a modified filament winding procedure, it is possible to prepare intricately shaped articles when the fiber blends are oriented in directions not parallel to the long axis of the article, utilizing thermoplastic polymers in conjunction with carbon fiber reinforcements. This modified filament winding process begins with the use of the intermixed tows of the instant invention. These tows may be fed directly to a filament winder. As the filament winder moves around or up and down the mandrel or form, the carbon fiber/thermoplastic fiber tow is applied directly to the mold and heated using a radiant heater or other suitable means for immediately melting and fusing the thermoplastic polymeric fibers within the carbon fiber tow. In other words, the carbon fiber/thermoplastic fiber tow should be heated under pressure as soon as or soon after it meets the mandrel. After full melting and resolidification occurs, the mandrel either may be dissolved using a suitable solvent, may be pulled from the product, or the mandrel may actually become a part of the product.

Another unique use for the fiber blends prepared according to the instant invention is in forming woven fabrics utilizing standard techniques. According to this process, the tow of the instant invention is used either alone or in combination with other tows or fibers to form a woven mat. The woven fabrics prepared according to the process of this invention may be applied to the desired mold or otherwise used in forming a composite. The previous method of choice of forming such materials involved laying down a layer of graphite, followed by a layer of thermoplastic film, followed by another layer of graphite, etc. Now the materials can be combined in a solid woven layer and much more readily applied to a mold. After the composite is formed, it is then heated under pressure above the flow point of the thermoplastic polymer, and a composite having good mechanical strength and stiffness properties results. The strength and stiffness enhancement can occur in one or more directions, i.e., those directions along which carbon fiber is aligned parallel to the defining vector.

EXAMPLE 1

A liquid crystal polymeric (LCP) fiber tow based upon a copolymer prepared from 6-hydroxy-2-napthoic acid and p-hydroxy benzoic acid was obtained. The LCP had a density of 1.4 g/cc, and the tow itself was formed of 660 filaments (2.25 denier per filament). The tow had an initial modulus of 5670 gms, a tenacity of 10.5 g/denier, and an elongation of 2%. The second fiber to be used for intermixing with the LCP fiber was Celion 3000 carbon fiber (3000 filament count), having a density of 1.7 g/cc, a tensile strength of $515 \times 10^3$ psi, a tensile modulus of $34 \times 10^6$ psi and an ultimate elongation of 1.5%. The carbon fiber is produced from a polyacrylonitrile precursor and is available from Celanese Specialty Operations, Hercules and Union Carbide.

Bobbins containing the LCP polymeric fiber tow and the Celion fiber tow were spaced apart on a bobbin rack. Fibers from both bobbins were fed onto and separately wrapped around a Godet roll, so that upon mixing the mixed two would contain approximately 50% by volume of liquid crystal polymer and approximately 50% by volume of carbon fiber. The LCP polymeric fiber was subject to a 50 gram weight on a tensioning device prior to being wrapped around the Godet roll, in order to maintain smooth tracking on the roll. After leaving the Godet roll, both fibers were separately subjected to air jet banding treatments utilizing an air jet which impinged air approximately perpendicular to the fiber through V-shaped nozzles. The jet for the liquid crystal polymer was operated at 5 psi, while the carbon fiber jet was operated at 4 psi. After leaving the banding jets, the fibers were brought together over the top and underneath of two parallel, longitudinally extended, staggered stationary bars and fed through fiber guides into an entanglement jet, which was similar in design to the gas banding jet and operated at a gas pressure of 7 psi. Following intimate intermixing of the two tows, the fibers were taken up on a takeup roll at a takeup speed of 7-8 m/min.

Test composite panels ($3\frac{1}{2}'' \times 10''$) were prepared using 25 layers of the intermixed fiber tow. Each layer was prepared by first wrapping a heated drum with a Kapton film and then filament winding parallel rows of the fiber blend prepared above onto the Kapton wrapped drum. A layer of Kapton film was then placed over the drum, and the entire wrapped drum was heated so as to temporarily fuse the fibers together. The composite containing the 25 fused layers was placed in a pressure mold, heated to 312° to 315° C. and held at this temperature for five minutes without application of significant mold pressure. The mold pressure was then increased to 500 psi at 315° C. and held under temperature and pressure for thirty minutes. The material was then cooled to 70° C. and removed from the mold. The resulting material contained 51.4% by volume of carbon fiber and had a panel thickness of 0.1027".

Utilizing the same process, an eight ply 3½"×10" composite panel was prepared having a carbon fiber volume of 60.3%, a panel thickness of 0.035". The composites were evaluated for tensile, flexural and compression properties with the following results:

TABLE I

| Properties | | Test Temperature | |
|---|---|---|---|
| 0° Tensile[1][2] | Strength (ksi) | RT | 224.4 ± 5.0 |
| | Modulus (Msi) | | 19.2 ± 0.4 |
| | Strength (ksi) | 200° F. | — |
| | Modulus (Msi) | | — |
| 0° Flexural[1] | Strength (ksi) | RT | 202 ± 23 |
| | Modulus (Msi) | | 16.8 ± 0.4 |
| | Strength (ksi) | 200° F. | 86 ± 7.7 |
| | Modulus (Msi) | | 14.7 ± 0.6 |
| 0° Compression[1] | Strength (ksi) | RT | 100.6 ± 7.5 |
| | Modulus (Msi) | | 21.1 ± 1.3 |
| | Strength (ksi) | 200° F. | 56.2 ± 6.9 |
| | Modulus (Msi) | | 17.1 ± 0.2 |
| 90° Flexural | Strength (ksi) | RT | 5.6 ± 0.2 |
| | Modulus (Msi) | | 0.91 ± 0.04 |
| | Strength (ksi) | 200° F. | 4.1 ± 0.02 |

[1]Fiber volume normalized to 62%.
[2]Performed on 8 ply. Remainder of tests performed on 25 ply.

EXAMPLE 2

Utilizing the same carbon fiber as described in Example 1, an approximate 50% by volume polybutylene terephthalate (PBT)/carbon fiber blend was prepared. The polybutylene terephthalate material had a density of 1.34 g/cc and a denier of 1520 g/9000 m. The polybutylene terephthalate had a draw ratio of 2.25-1, an initial modulus of 24 g, a tenacity of 5.3 g/denier, an elongation of 28%, a melting point of 227° C. and a denier per filament of 2.7. Seventeen packages of 33 filament count yarn were employed on a creel, and all packages were merged into a single polybutylene terephthalate fiber two on a Godet roll. Maintained, separately, but on the same Godet roll, was one package of 3000 filament count carbon fiber to provide a total approximate blend of 50/50 by volume carbon fiber/PBT.

The polybutylene terephthalate tow was fed through a fiber comb having approximately 30 teeth, while the carbon fiber tow was fed through a gas banding jet operating as described in Example 1, at a pressure of about 2½-3½ psi. The two tows were then intermixed over and under parallel extended rods by feeding both tows into the same area on the bars. Intermixing was aided by the use of a second gas banding jet of the type described in Example 1, operating at 2½-3½ psi. After leaving the banding jet, the fibers were fed through a second fiber comb which was arranged parallel to the direction of flow of the fiber, so as to provide a tensioning path to aid in intermixing. After leaving the comb, the fibers were fed through twist guides to provide approximately a one-half twist per yard, so as to maintain the fibers in their intermixed state. The fibers were then wrapped around a second Godet roll and taken up at a speed of 7-8 m/min. In order to minimize tension during the intermixing process, the second Godet roll was operated at a slightly slower speed than the first Godet roll.

3½×10" panel composites were prepared generally as described in Example 1 and evaluated with the results as shown in the attached table. Differences in processing conditions are noted in Table II.

A sample of the PBT/carbon fiber blend prepared above was wrapped with a 100 denier polybutylene terephthalate yarn as described above at four wraps per in. to form a compact yarn suitable for fabric weaving. The PBT fabric wrap was chosen, so that it would form a part of the matrix upon composite fabrication. The resulting wrapped yarn was then divided into 96 different yarn segments and placed on spools mounted on a special creel. A 6" wide fabric was then woven on a modified Draper XD loom, using a plain weave pattern. The resulting woven product had dimensions of 16 ends per inch×15 picks per inch and weighed 16 oz./yd². The fabric was 35 mils in thickness, was soft but compact,

TABLE II

| PROPERTIES FOR CARBON/PBT MATRIX LAMINATES (Example 2) | | | | | |
|---|---|---|---|---|---|
| | Test | Strength | | Modulus | |
| Process History | (Room Temp) | MPa | (ksi) | GPa | (Msi) |
| 22-ply at 468° F., 200 psi for 5 min., and reprocessed at 468° F., 300 psi for 20 min. Fiber volume was 51.6% and panel thickness was 0.1019". | 0° Flex | 938 ± 34 | (136 ± 5) | 115.2 ± 2.1 | (16.7 ± 0.3) |
| | 0° Compression | 659 ± 83 | (95.6 ± 12) | 130.4 ± 7.6 | (18.9 ± 1.1) |
| | Short Beam Shear | 39.9 ± 2.1 | (5.2 ± 0.3) | — | — |
| 8-ply at 468° F., 300 psi for 10 min. and reprocessed at 468° F., 300 psi for 2 min. Fiber volume was 49.5%, and thickness was 0.0415". | 0° Tensile | 1518 ± 34 | (220 ± 5) | 130.4 ± 4.8 | (18.9 ± 0.7) |
| Processed three times: 1. 300 psi for 30 min at 471° F. 2. 500 psi for 15 min at 471° F. 3. 500 psi for 15 min at 469° F. Fiber volume was 61.4%, and panel thickness was 0.0402" (8-ply panel). | 0° Tensile | 1525 ± 83 | (221 ± 12) | 164.9 ± 4.1 | (23.9 ± 0.6) | and exhibited good dimensional stability. Satisfactory fiber composites having irregular shapes are prepared from the resulting fabric.

EXAMPLE 3

An approximate 50/50% by volume blend was prepared based upon the carbon fiber described in Example 1 and a polyether ether ketone (PEEK) thermoplastic polymer. The fiber prepared from the PEEK had a density of 1.3 g/cc, a melting point of 338° C., an initial modulus of 53 grams, a tenacity of 2.7 g/denier, an elongation of 63%, and in 10 filaments per package tows a dpf of 367 (g/9000 m). Four (10 filaments per package) tows were placed on a creel and the fibers were blended together on a Godet roll, but maintained separately from the carbon fiber which was also wrapped around the Godet roll. The PEEK fiber was then directed through a fiber comb as described in Example 2 and into a gas banding jet. The carbon fiber after leaving the Godet roll also entered a gas banding jet. Both jets were operating at a pressure of about 3 psi. After leaving the jets the fibers were intermixed above and below two parallel, longitudinally extended rods and fed through a second parallel fiber comb, twisted to maintain dimensional stability, fed over a second Godet roll and taken up at a speed of 7-10 m/min. A satisfactory composition resulted.

What is claimed is:

1. A process for preparing a continuous, substantially uniform tow useful in forming composite molded articles which comprises:
   (a) forming a continuous tow of continuous carbon fibers;
   (b) forming a continuous tow of continuous thermoplastic polymers fibers having a melting point of at least about 50° C.;
   (c) uniformly and continuously spreading the thermoplastic polymer fiber tow to a selected width to preserve the separation of the individual fibers;
   (d) uniformly and continuously spreading the carbon fiber tow to a width that is essentially the same as the selected width for the thermoplastic polymer fiber tow;
   (e) intimately, uniformly and continuously intermixing the spread carbon fiber tow and the spread thermoplastic polymer fiber tow in a relatively tension-free state by bringing the tows into simultaneous contact with each other in substantially the same area such that there is provided a substantially uniform distribution of the thermoplastic fibers and the carbon fibers within an intimately intermixed tow; and
   (f) continuously withdrawing the intimately intermixed tow.

2. A process for preparing a continuous, substantially uniform tow useful in forming composite molded articles which comprises:
   (a) forming a continuous tow of continuous carbon fibers;
   (b) forming a continuous tow of continuous thermoplastic polymer fibers having a melting point of at least about 50° C.;
   (c) uniformly and continuously spreading the thermoplastic polymer fiber tow to a selected width to preserve the separation of the individual fibers;
   (d) uniformly and continuously spreading the carbon fiber tow to a width that is essentially the same as the selected width for the thermoplastic polymer fiber tow; and
   (e) intimately, uniformly and continuously intermixing the spread carbon fiber tow and the spread thermoplastic polymer fiber tow in a relatively tension-free state by employing a gas intermixing means which directs a generally perpendicular gas flow onto the fibers and by bringing the tows into simultaneous contact with each other in substantially the same area such that there is provided a substantially uniform distribution of the thermoplastic fibers and the carbon fibers within an intimately intermixed tow; and
   (f) continuously withdrawing the intimately intermixed tow.

3. The process of claims 1 or 2 wherein the carbon fibers are formed from polyacrylonitrile polymers and copolymers.

4. The process of claims 1 or 2 wherein the carbon fibers are formed from pitch blends.

5. The process of claims 1 or 2 wherein the carbon fiber tow has a bundle denier of about 300 to 100,000.

6. The process of claims 1 or 2 wherein the carbon fiber tow has a bundle denier of about 1000 to 16,000.

7. The process of claim 1 or 2 wherein the carbon fiber tow contains about 300 to 300,000 filaments.

8. The process of claims 1 or 2 wherein the carbon fiber tow contains about 3000 to 24,000 filaments.

9. The process of claims 1 or 2 wherein the thermoplastic polymer fibers are selected from the group consisting of polyethylene, polypropylene, polyesters, nylons, polyamidimides, polyetherimides, polysulfones, polyether ether ketones and wholly aromatic polyester resins.

10. The process of claims 1 or 2 wherein the thermoplastic polymer fibers are liquid crystal polymer fibers.

11. The process of claims 1 or 2 wherein the thermoplastic polymer fibers are wholly aromatic polyester fibers.

12. The process of claims 1 or 2 wherein the denier of the individual thermoplastic polymer fibers is in the range of about 1 to about 50 and wherein the thermoplastic polymer fiber tow contains from about 10 to about 150,000 filaments.

13. The process of claims 1 or 2 wherein the carbon fibers are prepared by a first heating step in the range of about 200° to 400° C., followed by a second heating step in the range of about 800° to 3000° C. and are based upon polyacrylonitrile polymers and copolymers.

14. The process of claims 1 or 2 wherein the intermixed tow contains about 10 to about 70 percent by volume of carbon fibers.

15. The process of claims 1 or 2 wherein the intermixed tow contains about 20 to about 60 percent by volume of carbon fibers.

16. The process of claim 15 wherein the intermixed tow contains about 60 percent by volume of carbon fibers.

17. The process of claims 1 or 2 wherein the intermixed tow contains about 10 to about 70 percent by volume of acrylonitrile-based polymeric or copolymeric carbon fibers and wherein the thermoplastic polymer fibers are selected from the group consisting of polyethylene, polypropylene, polyesters, nylons, polyamidimides, polyetherimides, polysulfones, polyether ether ketones and wholly aromatic polyester resins.

18. A process for preparing a composite article which comprises:
   (a) forming a continuous tow of continuous carbon fibers;
   (b) forming a continuous tow of continuous thermoplastic polymer fibers having a melting point of at least about 50° C.;
   (c) uniformly and continuously spreading the thermoplastic polymer fiber tow to a selected width to preserve the separation of the individual fibers;
   (d) uniformly and continuously spreading the carbon fiber tow to a width that is essentially the same as the selected width for the thermoplastic polymer fiber tow;
   (e) intimately, uniformly and continuously intermixing the spread carbon fiber tow and the spread thermoplastic polymer fiber tow in a relatively tension-free state by employing a gas box which directs a generally perpendicular gas flow onto the fibers and by bringing the tows into simultaneous contact with each other in substantially the same area such that there is provided a substantially uniform distribution of the thermoplastic fibers and the carbon fibers within an intimately intermixed tow; and
   (f) continuously withdrawing the intimately intermixed tow.

19. A process for preparing a continuous, substantially uniform tow useful in forming composite molded articles which comprises:
   (a) forming a continuous tow of continuous carbon fibers;
   (b) forming a continuous tow of continuous thermoplastic polymer fibers having a melting point of at least about 50° C.;
   (c) uniformly and continuously spreading the thermoplastic polymer fiber tow to a selected width to preserve the separation of the individual fibers;
   (d) uniformly and continuously spreading the carbon fiber tow to a width that is essentially the same as the selected width for the thermoplastic polymer fiber tow;
   (e) intimately, uniformly and continuously intermixing the spread carbon fiber tow and the spread thermoplastic polymer fiber tow in a relatively tension-free state by bringing the tows into simultaneous contact with each other in substantially the same area of a longitudinally extended, substantially horizontal, non-drawing rod such that there is provided a substantially uniform distribution of the thermoplastic fibers and the carbon fibers within an intimately intermixed tow; and
   (f) continuously withdrawing the intimately intermixed tow.

20. The process of claim 19 wherein a second non-drawing rod is employed.

* * * * *